US008015803B2

(12) United States Patent
Huber et al.

(10) Patent No.: US 8,015,803 B2
(45) Date of Patent: Sep. 13, 2011

(54) OPERATING METHOD FOR A SYSTEM COMPOSED OF A REFORMER AND A CATALYTIC EXHAUST GAS AFTERTREATMENT DEVICE

(75) Inventors: Jochem Huber, Munich (DE); Michael Preis, Koenigsbrunn (DE); Juergen Ringler, Bergkirchen (DE); Christian Liebl, Eching (DE)

(73) Assignee: Bayerische Motoren Werke Aktiengellschaft, Munich (DE)

( * ) Notice: Subject to any disclaimer, the term of this patent is extended or adjusted under 35 U.S.C. 154(b) by 109 days.

(21) Appl. No.: 12/273,166

(22) Filed: Nov. 18, 2008

(65) Prior Publication Data
US 2009/0071420 A1 Mar. 19, 2009

Related U.S. Application Data

(63) Continuation of application No. PCT/EP2007/003888, filed on May 3, 2007.

(30) Foreign Application Priority Data

Jun. 3, 2006 (DE) .......................... 10 2006 026 095
Oct. 26, 2006 (DE) .......................... 10 2006 050 560

(51) Int. Cl.
*F01N 3/00* (2006.01)
(52) U.S. Cl. ................ 60/286; 60/274; 60/284; 60/295; 60/300; 60/301
(58) Field of Classification Search ............ 60/273–275, 60/284–286
See application file for complete search history.

(56) References Cited

U.S. PATENT DOCUMENTS

| 4,218,992 | A | * | 8/1980 | Latsch et al. .................. 123/263 |
| 6,041,593 | A | * | 3/2000 | Karlsson et al. ................ 60/284 |
| 6,521,204 | B1 | | 2/2003 | Borup et al. |
| 6,810,658 | B2 | * | 11/2004 | Kaupert et al. ................ 60/274 |

(Continued)

FOREIGN PATENT DOCUMENTS

DE 101 27 199 A1 2/2002

(Continued)

OTHER PUBLICATIONS

Jean J. Botti et al., "Emissions Reduction Through Hydrogen Enrichment", Which Fuels For Low $CO_2$ Engines? © P. Duret (Editor) and Editions Technip, Paris, 2004, pp. 1-13, 27 rue Ginoux, 75015 Paris.

(Continued)

*Primary Examiner* — Thomas E Denion
*Assistant Examiner* — Jesse Bogue
(74) *Attorney, Agent, or Firm* — Crowell & Moring LLP

(57) ABSTRACT

An operating method for a system including a reformer which in reformate mode can convert hydrocarbon-containing fuel to a hydrogen-rich reformate gas, and a catalytic exhaust gas aftertreatment device which is acted upon by reformer gas to reach the catalytic converter light-off temperature more rapidly. During cold starts, the reformer, after its own starting phase, is initially operated in a so-called lean-burn mode, and the reformer is switched from lean-burn mode to reformate mode as soon as combustible constituents in the catalytic aftertreatment device can be independently oxidized. During the reformer lean-burn mode, the combustible constituents of the engine's exhaust gas react with the hot reformer gas, such that the cumulative exhaust gas flow has the composition of exhaust gas generated by stoichiometric combustion.

9 Claims, 3 Drawing Sheets

U.S. PATENT DOCUMENTS

| | | |
|---|---|---|
| 6,869,456 B2 | 3/2005 | Salemi et al. |
| 7,243,488 B2 * | 7/2007 | Bonadies et al. ............... 60/295 |
| 2003/0163988 A1 * | 9/2003 | Kirwan et al. ................. 60/289 |
| 2004/0216451 A1 | 11/2004 | LaBarge et al. |
| 2005/0274104 A1 | 12/2005 | Bromberg et al. |

FOREIGN PATENT DOCUMENTS

| | | |
|---|---|---|
| DE | 101 35 646 A1 | 2/2003 |
| DE | 102 32 737 B4 | 2/2004 |
| DE | 10 2004 025 965 A1 | 12/2005 |
| DE | 10 2005 030 474 A1 | 1/2007 |
| EP | 1 231 183 A2 | 8/2002 |
| EP | 1 468 722 A2 | 10/2004 |
| EP | 1 486 253 A1 | 12/2004 |
| EP | 1 522 697 A2 | 4/2005 |
| WO | WO 2004/101965 A1 | 11/2004 |

OTHER PUBLICATIONS

German Search Report dated Dec. 20, 2006 w/English translation of pertinent portions (nine (9) pages).

German Search Report dated Aug. 20, 2007 w/English translation of pertinent portions (nine (9) pages).

International Search Report dated Jul. 23, 2007 w/English translation (six (6) pages).

* cited by examiner

OPERATING METHOD FOR A SYSTEM COMPOSED OF A REFORMER AND A CATALYTIC EXHAUST GAS AFTERTREATMENT DEVICE

CROSS-REFERENCE TO RELATED APPLICATIONS

This application is a U.S. Continuation Application of International Application No. PCT/EP2007/003888, filed May 3, 2007, and claims priority under 35 U.S.C. §119 to German Patent Application No. 10 2006 026 095.3, filed Jun. 3, 2006, and German Patent Application No. 10 2006 050 560.3, filed Oct. 26, 2006, the entire disclosures of which are expressly incorporated by reference herein.

BACKGROUND AND SUMMARY OF THE INVENTION

The invention relates to an operating method for a system composed of a reformer which, in a so-called reformate mode, can convert supplied hydrocarbon-containing fuel by a reforming method into a hydrogen-rich reformate gas—particularly having hydrogen, carbon monoxide and nitrogen—and a catalytic exhaust gas aftertreatment device which is provided particularly for the exhaust gas of an internal-combustion engine and which is acted upon by the gas generated in the reformer in order to reach the catalytic converter light-off temperature more rapidly. Concerning the known state of the art, reference is made to German Patent Document DE 102 32 737 B4.

Reformer systems can be used, for example, in motor vehicles for producing a hydrogen-rich synthesis gas consisting of hydrogen ($H_2$), carbon monoxide (CO) and inert gas ($N_2$, $CO_2$, $H_2O$) from liquid or gaseous hydrocarbon-containing fuels (such as gasoline, diesel, alcohols or methane or natural gas). Depending on the compound ($O_2$, $H_2O$, $CO_2$) participating in addition to the hydrocarbon, different reforming methods are known, specifically, the so-called partial oxidation, the vapor reformation, the $CO_2$ reformation, cracking, or also combinations thereof, such as the so-called autothermal reformation.

The partial oxidation, that is, the so-called reformate mode of a reformer operating according to the reformer principle of partial oxidation, takes place in an exothermal manner. However, in order to start such a reformer, conventionally, an air supplying device is operated first, after which a first combustion is carried out in front of a catalytic converter provided in the reformer. Subsequently, this catalytic converter of the reformer is acted upon by a "rich" fuel/air mixture (that is, by a mixture with an understoichiometric air fraction, which corresponds to a lambda value of less than "1") and thereby heated further until the reformer has reached its reformation operating temperature. The reformer then operates in the actual so-called reformate mode with an understoichiometric, very rich mixture (with lambda values in the order of from 0.3 to 0.4) and a system-dependent reformation temperature in the order of from 800° C. to 900° C. However, up to this point in time, exhaust gas emissions occur which should not be ignored.

Reformer systems can be used either in combination with fuel cells or alone, for example, in motor vehicles. In this case, numerous possibilities are known of using and utilizing the so-called reformate gas obtained in the reformate mode; thus, for example, for the operation of a fuel cell, or for feeding to an internal-combustion engine operating as a vehicle drive assembly for minimizing its cold-start/warm-up and crude emissions; in addition, also for the heating of a catalytic exhaust gas aftertreatment device, particularly for the emissions of the above-mentioned internal-combustion engine, or directly for the aftertreatment of the internal-combustion engine exhaust gas, for example, in $NO_x$ adsorbers or particle filters.

A catalytic exhaust gas aftertreatment device can carry out its function, specifically the conversion of CO, HC and/or $NO_x$ to $CO_2$, $H_2O$ and/or $N_2$, only when the also so-called catalytic exhaust gas converter has reached or exceeded its so-called light-off temperature. Various measures are known for reaching this state as soon as possible, starting from a cold start of an above-mentioned internal-combustion engine as well as the pertaining catalytic exhaust gas aftertreatment device (="catalytic exhaust gas converter"). In addition to a targeted influencing of the combustion in the internal-combustion engine in the sense of an increased exhaust gas mass flow rate and/or an increased heat flow rate in the exhaust gas as well as exothermal subsequent reactions in the exhaust line, the catalytic exhaust gas converter can also be heated by the external feeding of electric energy.

It is known that the height of the so-called light-off temperature of the catalytic converter of an exhaust gas aftertreatment device depends on various parameters; thus, on the one hand, on the construction of the catalytic converter itself; that is, on its substrate, number of cells, heat capacity, precious metal components, precious metal loading, etc.; also, on its aging condition; in addition, on the oxygen fraction in the exhaust gas flow to be converted; and furthermore, directly on the composition of the exhaust gas to be converted. In this context, it is known that, by reformate gas generated in a reformer, a catalytic exhaust gas aftertreatment device can be heated. In comparison to the conventional heating, the advantage of a catalytic converter heating by reformate gas (or the aiding of the catalytic converter heating by reformate gas) is the increase of the hydrogen fraction and of the carbon monoxide fraction, on the basis of which, the catalytic conversion of the pollutants already starts at lower temperatures (in the order of from 150° C. to 180° C.). Advantageously, as a result of the direct conversion of hydrogen and carbon monoxide at the active catalytic converter surface, the heat is released precisely where it is required for the catalytic effect. As it were, a direct internal heating of the catalytic converter surface takes place in contrast to an external inefficient heating by way of complex heat transfers, in which considerable transmission losses occur. At the same time, an increased thermal energy aiding the heating is made available to the catalytic converter as a result of the fed reformate gas.

However, during the warm-up phase of a catalytic exhaust gas aftertreatment device, to which reformate gas generated in a reformer is fed for shortening this warm-up phase, a time window exists despite the relatively low conversion temperature of hydrogen and carbon monoxide, in which time window, carbon monoxide can reach the environment uncoverted by the catalytic exhaust gas converter, specifically up to the point in time as of which the catalytic converter is capable of significantly converting carbon monoxide. The reason is that, up to this point in time, carbon monoxide and other gas constituents (water vapor, hydrocarbon radials, etc.) block the active centers of the catalytic converter, so that the conversion also of all other exhaust gas constituents—particularly of hydrogen—up to the above-mentioned point in time, does not take place to a significant extent. Since reformate gas, which was produced in the reformate mode in a reformer, contains approximately 24% carbon monoxide, in addition, defined strict exhaust gas limit values for motor vehicles, which are virtually valid worldwide, cannot be observed.

Hereby, an operating method for a system composed of a reformer which, in a so-called reformate mode, can convert supplied hydrocarbon-containing fuel by means of a reforming method to a hydrogen-rich reformate gas, and of an internal-combustion engine having an exhaust gas system with catalytic exhaust gas aftertreatment device which is acted upon by the gas generated in the reformer in order to reach the catalytic converter light-off temperature more rapidly, therefore is to be indicated, as a result of which the described problems will not occur (=object of the present invention).

The achieving of this object is characterized in that, during a cold start of the system, the reformer, after its own starting phase, is first operated by a lean fuel/air mixture, and therefore is not operated in the reformate mode but in a so-called lean-burn mode. This lean-burn mode, which can also be called a "lean combustion mode", is represented as the combustion of an overstoichiometric mixture, which corresponds to a lambda value of greater than "1".

Detailed explanations of the suggested method of the reformer operation of the lean-burn mode will follow. In this case, it should first be explicitly pointed out that the term "cold start" applies to any start or starting operation of a system according to the invention, where the catalytic converter of the exhaust gas aftertreatment device has a lower temperature than its light-off temperature (or conversion temperature), so that a successful conversion of harmful exhaust gas constituents in the catalytic exhaust gas converter cannot take place.

If, in addition, as provided for a preferred application, an internal-combustion engine is a component of a system according to the invention, this internal-combustion engine can be operated such during the reformer operation in the lean-burn mode that combustible constituents of the exhaust gas of the internal-combustion engine can react in its exhaust system with the hot gas generated by the reformer and fed upstream of the exhaust gas aftertreatment device provided therein, in which case, the cumulative exhaust gas flow guided through the catalytic converter of the exhaust gas aftertreatment device and consisting of the gas generated in the reformer and the exhaust gas of the internal-combustion engine essentially has the composition of an exhaust gas generated by the combustion of a stoichiometric mixture. Furthermore, during the above-mentioned warm-up phase, the hydrocarbons (HC) emitted by the internal-combustion engine can be intermediately stored in an HC adsorber connected in front of the exhaust gas aftertreatment device.

Returning to the characterizing features of claim 1, it is suggested to start the reformer with low emissions in that, after the initiation of a first combustion in front of the catalytic converter of the reformer, the reformer is operated for a certain time period with a lean fuel/air mixture, that is, in a so-called "lean-burn mode" or as a so-called lean-mixture burner. As a result, during the thereby continued warm-up of the catalytic converter of the reformer, which is carried out in the conventional state of the art with a rich fuel/air mixture, significantly lower emissions, particularly of hydrocarbons and carbon monoxide, are produced. Advantageously, the combustion heat generated in this "lean-burn mode" can easily be adjusted or regulated by way of the composition of the mixture fed to the reformer and the air mass flow fed to the reformer and, as a result of the corresponding guidance of the thus obtained reformer gas, is particularly also fed to the catalytic exhaust gas aftertreatment device for heating, in which case, the heat flow provided by the reformer for the heating of the catalytic exhaust gas converter can be adjusted according to the requirements. Thus, by the hot gas generated in the reformer from the "lean-burn mode", a sufficiently large partial volume of the catalytic exhaust gas converter can be brought to the light-off or conversion temperature as rapidly as possible, in which case preferably the maximally conceivable reformat mass flow is to be utilized which the reformer operated as a lean-mixture burner can provide in its "lean-burn mode."

Accordingly, the reformer is preferably operated in the above-mentioned lean-burn mode until the fed combustible constituents can be oxidized independently with sufficient reliability in the catalytic exhaust gas aftertreatment device; that is, until the catalytic exhaust gas converter has reached or exceeded its light-off temperature. Subsequently, the reformer can be switched over to the normal operating reformat mode.

In addition, in the so-called lean-burn mode, at least a portion of those deposits that form in the reformer during its operation in the reformate mode, can be burnt off and thereby removed. The carrying-out of the lean-burn mode suggested here therefore has the advantageous effect for the reformer that the latter is freed of deposits. Accordingly, the reformer can also be operated in the lean-burn mode in order to oxidize deposits from a preceding reformate mode within the reformer, in which case the operating mode of the reformer is switched from the lean-burn mode to the reformate mode as soon as such deposits at least empirically are essentially oxidized. In this case, the lean-burn mode can be maintained for a certain time period, during which empirically present deposits in the reformer are essentially burned off. However, it is also conceivable to appropriately determine or measure the presence of significant deposits and to then operate the lean-burn mode until no more significant deposits can be determined.

As mentioned above, the preferred use of a system according to the invention is in the motor vehicle field in connection with an internal-combustion engine as a vehicle drive assembly. The hot gas flow generated in the reformer, which still contains free oxygen, is now, during the lean-burn mode of the reformer in the exhaust system of the internal-combustion engine, upstream of the catalytic exhaust gas treatment device, admixed to the exhaust gas flow of the internal-combustion engine which, after a cold start, is initially still relatively cold, so that the combustible constituents of the internal-combustion engine exhaust gas can be afterburned there. In this case preferably relatively cold, moderately rich exhaust gas of the internal-combustion engine is mixed with the hot and lean gas generated in the reformer in such a manner in the exhaust as system of the system upstream of the catalytic exhaust gas converter that a desired total fuel/air ratio occurs there. As a result, on the one hand, a desired afterburning can occur in the exhaust gas system, in which case, the exothermal character of this conversion, in addition to the thermal energy of the gas from the reformer, can be utilized for heating the catalytic exhaust gas converter. For a rapid heating of the catalytic exhaust gas converter (that is, of the catalytic exhaust gas aftertreatment device), favorable high temperatures are generated if the cumulative exhaust gas flow guided through the catalytic exhaust gas converter and consisting of the gas generated in the reformer and the exhaust gas of the internal-combustion engine essentially has the composition of an exhaust generated from the combustion of a stoichiometric mixture (lambda value essential equal to "1"). In this manner, virtually several heat sources are obtained for the catalytic exhaust gas converter, specifically the direct heat supply by way of the warm gas obtained in the reformer as well as by way of the afterburning of the rich internal-combustion engine exhaust gas still containing combustible fuel constituents.

Advantageously, a correspondingly composed cumulative exhaust gas flow, specifically essentially in the composition of an exhaust gas generated from the combustion of a stoichiometric mixture, can be aftertreated in the best possible manner in a three-way catalytic converter while the latter is heated; that is, the harmful exhaust gas constituents contained therein can be converted in the best possible manner by this exhaust gas composition, particularly since the reaching of the converting capability of the catalytic exhaust gas converter represents no step function, so that, with a targeted adjustment of the fuel/air ratio, a partial conversion can also already be achieved in a conventional three-way catalytic converter.

Thus, an externally ignited internal-combustion engine, which does not operate with a direct fuel injection (where the fuel is added to the fed combustion air current outside the combustion chambers), during the reformer operation in the lean-burn mode (and thus during the warm-up phase of the exhaust gas aftertreatment device), can initially be operated with such a moderately rich fuel/air mixture that the above-mentioned composition of the cumulative exhaust gas flow of the internal-combustion engine exhaust gas and the reformer gas occurs. In this case, the composition of the mixture fed to the internal-combustion engine can also be coordinated with respect to the engine-related driving comfort. Advantageously, the usual heating measures for the catalytic exhaust gas converter, which increase the fuel consumption, can then largely be eliminated. However, for the acceleration of the further heating of the catalytic exhaust gas converter, such measures may still be provided in a reduced fashion. The same naturally also applies to internal-combustion engines operated with direct fuel injection. For the latter, it is suggested that the internal-combustion engine be supplied with increased fuel during the reformer operation in the lean-burn mode, which fuel can preferably be placed in the combustion chambers of the internal-combustion engine in the manner of the known fuel after-injection. This increased feeding of fuel in the combustion chamber(s) of an internal-combustion engine operated with direct fuel injection shall preferably take place, when the products generated in the internal-combustion engine from this additional fuel can be converted in the above-mentioned exhaust gas aftertreatment device or in front of this device (viewed in the exhaust flow direction).

After a certain time period, particularly when the temperature of the catalytic exhaust gas converter is above its so-called light-off temperature for the conversion of carbon monoxide and/or above the light-off temperature or desorption temperature for other (stored gas constituents) and which, based on a cold start of the system, may, for example, by on the order of 10 seconds, and/or as soon as the internal-combustion engine can be operated with a moderately lean fuel/air mixture, not only the internal-combustion engine is operated with a corresponding moderately lean mixture, but the operating mode of the reformer is then also changed; that is, the so-called "lean-burn mode" is then terminated, and the reformer is subsequently operated in the normal reformate mode, in which conventional reformate gas (particularly $H_2$ and CO) is produced. As of this point in time, the direct heat release in the catalytic exhaust gas converter is then initiated by way of the direct catalytic conversion of hydrogen-rich synthesis gas. In this case, the demanded reformate mass flow rate can be controlled or regulated as a function of the available oxygen mass flow rate, the exhaust gas mass flow rate of the internal-combustion engine, the desired overall exhaust gas lambda, etc., in which case, at least when a three-way catalytic converter is used, preferably again such a lambda value is set in the cumulative exhaust gas flow, which essentially corresponds to the composition of an exhaust gas generated by the combustion of a stoichiometric mixture (lambda value essentially equal to "1").

For an advantageous further development, at least during the reformer operation in the lean-burn mode or during the warm-up phase of the catalytic exhaust gas converter, the hydrocarbons emitted by the internal-combustion engine can be intermediately stored in a hydrocarbon adsorber fluidically connected in front of the catalytic exhaust gas converter and preferably also the blow-in point of the reformate gas into the exhaust system. At a later point in time, particularly after the catalytic exhaust gas converter has reached its conversion temperature, these can then again be desorbed. Furthermore, it is in fact basically known to regenerate some units preferably installed downstream of the catalytic exhaust gas converter in the exhaust gas system of the internal-combustion engine, particularly for the exhaust gas treatment, which may, for example, be a catalytic $NO_x$ storage converter or a particle filter, by starting a reformer that is already provided anyhow and the feeding of reformate gas connected therewith. This can also return an exhaust gas aftertreatment device that has cooled down for some reason back to its operating temperature or light-off temperature. A corresponding situation is also conceivable in connection with an operating method according to the invention, specifically in that, when being started, the reformer is at least initially operated in the above-mentioned lean-burn mode. In addition, the lean-burn mode can also be chosen with a view to a warming-up of the reformer itself in such a manner that the operation of the reformer is switched from the lean-burn mode to the reformate mode when the reformer itself has heated up so far that it can be operated with low emissions in the reformate mode. The term "with low emissions" is to be understood in that significantly lower pollutant emissions are to be detected in the reformate mode with such a preceding warm-up by way of the operation in the lean-burn mode than this would be the case during an operation in the reformate mode without a previous warm-up by the lean-burn mode.

Other objects, advantages and novel features of the present invention will become apparent from the following detailed description when considered in conjunction with the accompanying drawings.

BRIEF DESCRIPTION OF THE DRAWINGS

The attached In FIGS. 1A-1E, for an externally ignited internal-combustion engine not operated with direct injection, and in FIGS. 2A-2E, for an externally ignited internal-combustion engine operated with direct injection, the individual figures illustrate the following:

DETAILED DESCRIPTION

Figure 1A:
FIGS. 1A-1E and 2A-2E illustrate the time sequences of various characterizing values over identical time axes which occur in the case of a preferred embodiment implementation of the operating method according to the invention.
Figure 1B:
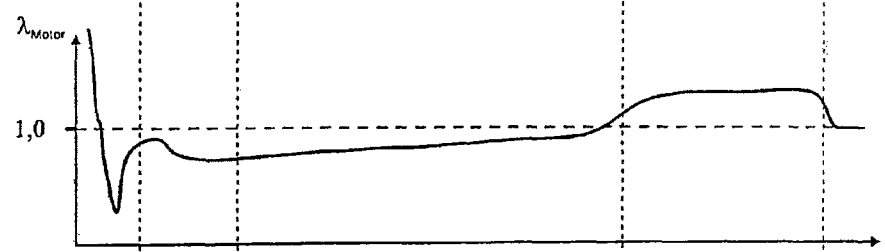
Figure 1C:
Figure 1D:
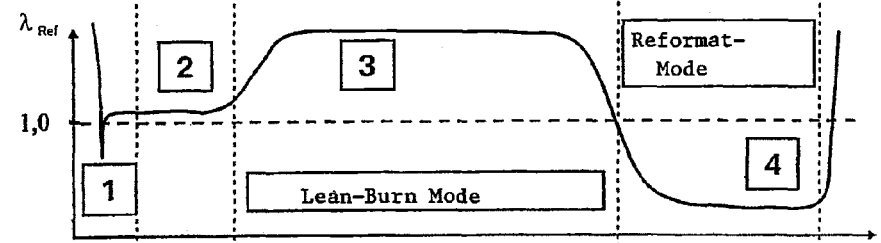
Figure 1E:
Figure 2A:
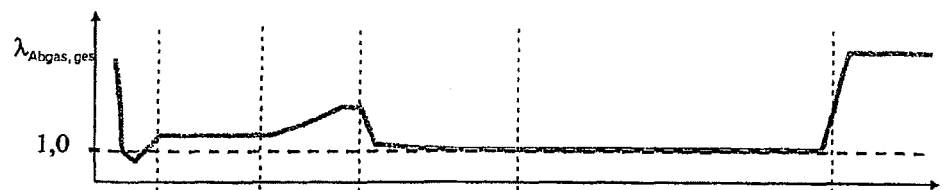
Figure 2B:
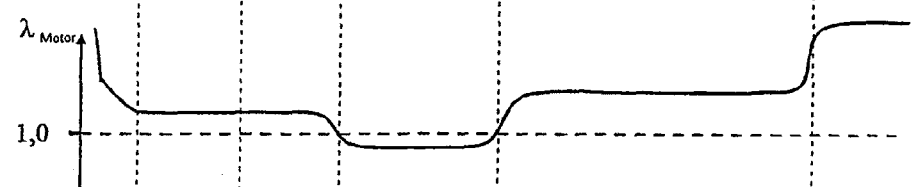
Figure 2C:
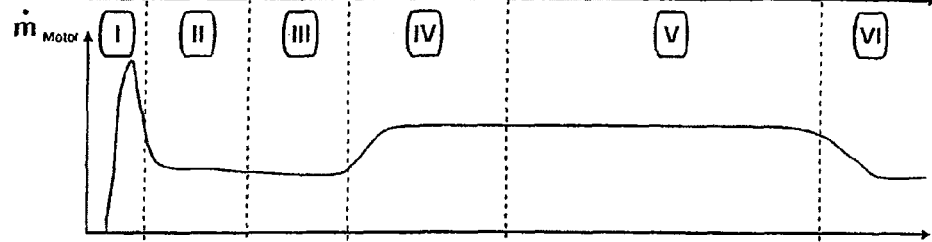
Figure 2D:
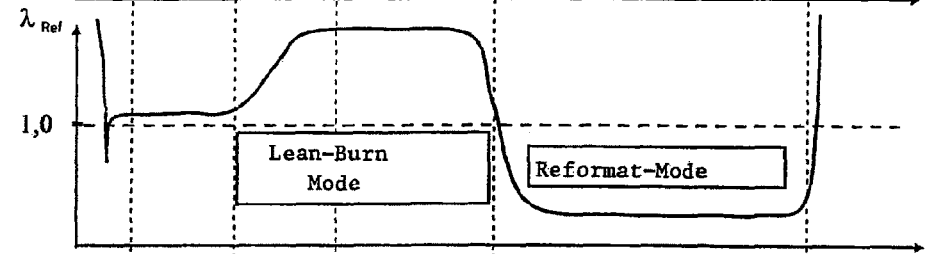
Figure 2E:
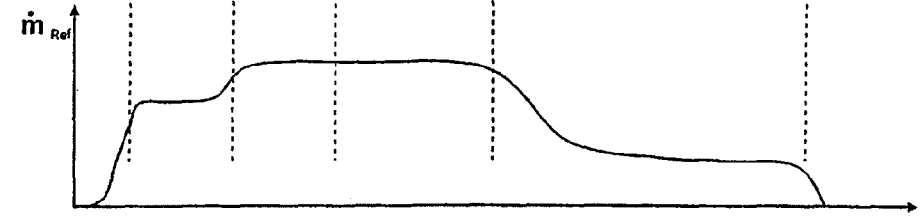
Figure 3:
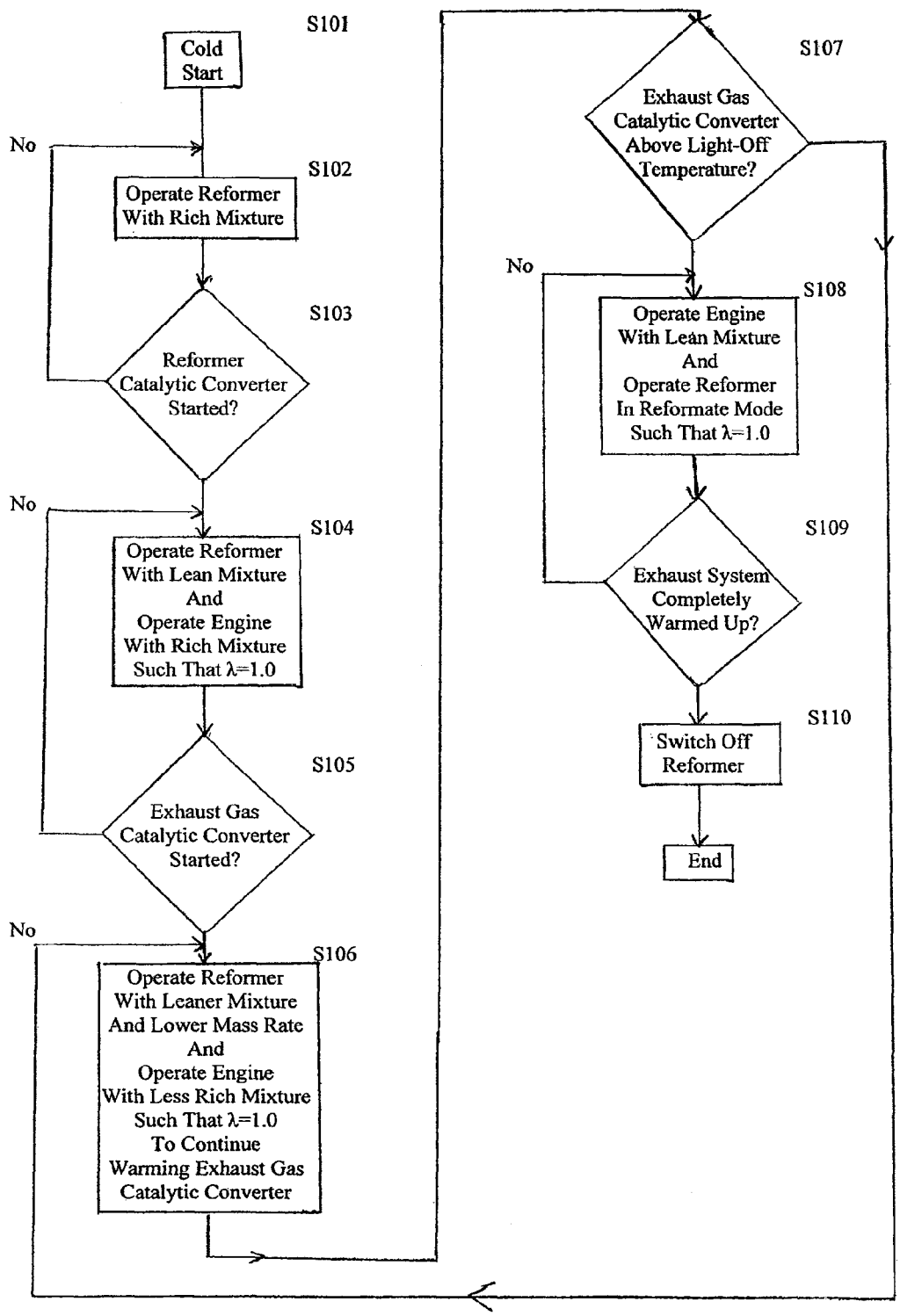
FIG. 3 illustrates a flow chart for an embodiment of the method of the present invention.

The respective top FIGS. 1A and 2A respectively show the lambda value ($\lambda_{exhaust\,gas,total}$) of the total exhaust gas flow; that is, of the combined exhaust gas of the internal-combustion engine and of the gas obtained in the reformer over the time; the second FIGS. 1B and 2B respectively illustrate the lambda value ($\lambda_{engine}$) of the mixture fed to the internal-combustion engine;

FIGS. 1C and 2C respectively show the air mass flow $m_{engine}$ fed to the internal-combustion engine;

FIGS. 1D and 2D respectively show the lambda value ($\lambda_{ref}$) of the fuel/air mixture fed to the reformer; and the bottom FIGS. 1E and 2E respectively show the air mass flow $m_{ref}$ fed to the reformer.

The different phases and operating modes respectively in which the reformer is operated according to the invention are marked in FIG. 1D and in FIG. 2C.

With reference to FIGS. 1A-1E, following a cold start (step S101), the reformer initially receives a rich mixture (lambda less than "1") (step S102) for an extremely short time in order to start the catalytic converter provided in the reformer (step S103). Subsequently, in phase 2, the reformer can easily be operated in a lean fashion, that is, with a lambda value only slightly greater than "1.0" (step S104), in order to force the warming-up of the reformer, in which case, during this short time period following a cold start, no overheating problems can occur yet. For this purpose, the internal-combustion engine can be operated with a moderately rich mixture (lambda less than "1.0"), which promotes a smooth running (step S104). Here, the adjustment of all parameters (that is, of the respective air mass and fuel mass feeding) is already chosen such that a lambda value of essentially "1.0" occurs in the total exhaust gas flow (step S104).

In the subsequent phase 3(step S105), the internal-combustion engine can be operated with a slightly less rich mixture than in phase 2 but still at a lambda value of less than "1.0", the reformer being operated with a lower mass flow rate and a considerably leaner mixture (lambda significantly greater than "1.0") in order to avoid overheating problems in the reformer (step S106). Particularly in this operating phase or operating mode, which here is called a lean-burn mode, the exhaust gas of the internal-combustion engine still containing combustible fuel constituents in the exhaust gas system is afterburned upstream of the catalytic converter by the admixing of the hot gas generated in the reformer, which hot gas still contains free residual oxygen because of the lean operation of the reformer. The heat released in this process is completely available for the warming-up of the catalytic exhaust gas converter.

Finally, in phase 4, when the temperature of the catalytic exhaust gas converter is significantly above its light-off temperature for the individual exhaust gas constituents (step S107) and when the internal-combustion engine can be operated with a slightly lean mixture, a change takes place in the reformer to the actual reformate mode, in which the reformer is operated with a very rich mixture (lambda considerably lower than "1.0") (step S108). Finally, —following phase 4 and with the complete warming-up of the exhaust gas system of the internal-combustion engine (step S109)—the reformer can be switched off (mref =0; compare Figure A5) (step S110).

With the exception of a peak at the start of this entire process, a lambda value of essentially equal to "1.0" always occurs in the cumulative exhaust gas flow (FIG. 1) (virtually constant) (steps S104, S106, S108). In this manner, optimal conversion conditions are ensured in the three-way catalytic exhaust gas converter. The regulating parameters are particularly the air mass flow rate fed to the reformer as well as the fuel/air mixture composition fed to the reformer.

With reference to FIGS. 2A-2E, phase 1 is the starting phase of the reformer (analogous to phase 1 of FIGS. 1A-1E) as well as of the internal-combustion engine, in which case the latter, as required, can be started with a lean mixture and, in the so-called afterstart phase II, can be operated in a lean stratified fashion. In this case, low crude emissions of the internal-combustion engine are preferably taken into account while, for a faster warm-up, the reformer is also operated with low emissions with a lambda value close to =1, with the goal of initiating as soon as possible a maximal heat flow upstream of the catalytic exhaust gas converter into the exhaust gas system of the internal-combustion engine.

As soon as the reformer has reached its (maximal) operating temperature, the latter is operated in the so-called lean-burn mode; that is, in this phase III, a lambda value is set at the reformer which is as high as possible, whereby overheating problems can also be avoided. In this phase III—as long as the light-off temperature of the catalytic exhaust gas converter has not yet been reached—the lambda value of the total exhaust gas flow (compare FIG. 2A) can be set to moderately lean, in order to create optimal conversion conditions in the catalytic exhaust gas converter. After the exceeding of the light-off temperature of the catalytic exhaust gas converter, the internal-combustion engine can be operated in phase IV with a fuel afterinjection, particularly in order to achieve a maximal heat flow for the increased warming-up of the exhaust gas system and particularly of the catalytic exhaust gas converter provided therein. In this case, the reformer is still operated in the lean-burn mode so that a lambda value of approximately "1" now occurs in the cumulative exhaust gas flow.

As soon as the exhaust gas catalyst has reached its light-off temperature or has slightly exceeded it, so that it is ensured that combustible constituents fed in the catalytic exhaust gas aftertreatment device are independently oxidized with sufficient reliability, the reformer is changed from the lean-burn mode to the actual reformate mode. In this phase V, the afterinjections of fuel into the combustion chambers of the internal-combustion engine can be moderately reduced. Preferably, the lambda value of the cumulative exhaust gas flow is essentially set to the "1" value, particularly in order to achieve a further strong warming-up of the exhaust gas system and of the catalytic exhaust gas converter. Finally, in the subsequent phase VI, the reformer is switched off ($m_{ref}$=0; compare FIG. 2E) and the internal-combustion engine operates in the usual stratified operation.

Without reference to a special embodiment, by the suggested operating method, a catalytic exhaust gas aftertreatment device, while observing the emission limit values prescribed by law, can be brought so rapidly to its light-off temperature or operating or conversion temperature that this catalytic exhaust gas converter can also be installed farther away from the internal-combustion engine than previously customary in the exhaust gas system, whereby several advantages are achieved. On the one hand, this results in a lower exhaust back pressure and also in a reduced fuel consumption because the so far widespread so-called full-load enrichment known to the person skilled in the art can be reduced considerably. The amount of precious metal of the catalytic converter coating as well as the number of cells of the catalytic converter monoliths can also be reduced because of the therefore decreased thermal aging. In this case, it should also be pointed out that a plurality of details may be designed to deviate from the above explanations without leaving the content of the patent claims.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An operating method for a system, the system comprising a reformer, the reformer having a reformate mode in which hydrocarbon-containing fuel is converted by reforming to a hydrogen-rich reformate gas, and an internal combustion engine with an exhaust gas system with an catalytic exhaust gas aftertreatment device, the catalytic exhaust gas aftertreatment device being acted upon by gas generated in the reformer so as to reach a catalytic converter light-off temperature more rapidly during a cold start of the system, comprising the acts of:

initially operating the reformer, after its own starting phase, with a lean fuel/air mixture in a lean-burn mode;
   operating the internal-combustion engine during the reformer operation in the lean-burn mode such that combustible constituents of the exhaust gas of the internal-combustion engine react with hot gas generated by the reformer and supplied upstream of the exhaust gas aftertreatment device; and
   guiding a cumulative exhaust gas flow consisting of the gas generated in the reformer and the exhaust gas of the internal-combustion engine guided through a catalytic converter of the catalytic exhaust gas aftertreatment device,
   wherein the cumulative exhaust gas flow has essentially a composition of an exhaust gas generated from the combustion of a stoichiometric fuel/air mixture.

2. The operating method according to claim 1, wherein the operating mode of the reformer is switched from the lean-burn mode to a reformate mode as soon as the catalytic exhaust gas aftertreatment device reaches a temperature at which combustible constituents supplied to the catalytic exhaust gas aftertreatment device are independently oxidized.

3. The operating method according to claim 2, wherein the internal combustion engine is an externally ignited internal-combustion engine without direct fuel injection, and
during the reformer operation in the lean-burn mode, the internal combustion engine is operated with a moderately rich fuel/air mixture.

4. The operating method according to claim 2, wherein the internal combustion engine operates with direct fuel injection, and
during the reformer operation in the lean-burn mode, the internal combustion engine is operated with increased fuel provided by a fuel after-injection.

5. The operating method according to claim 3, wherein at least during the reformer operation in the lean-burn mode, hydrocarbons emitted by the internal-combustion engine are intermediately stored in an HC adsorber arranged upstream of the exhaust gas aftertreatment device.

6. The operating method according to claim 4, wherein at least during the reformer operation in the lean-burn mode, hydrocarbons emitted by the internal-combustion engine are intermediately stored in an HC adsorber arranged upstream of the exhaust gas aftertreatment device.

7. The operating method according to claim 1, wherein for regeneration or for raising a temperature of a unit provided in the exhaust gas system, the reformer operation is started and during the regeneration or temperature raising the reformer is at least initially operated in the lean-burn mode.

8. The operating method according to claim 7, wherein the reformer is operated in the lean-burn mode in order to oxidize deposits from a preceding reformate mode operation in the reformer, and the operation of the reformer is switched from the lean-burn mode to the reformate mode as soon as the deposits from a preceding reformate mode are at least empirically essentially oxidized.

9. The operating method according to claim 1, wherein the operation of the reformer is switched from the lean-burn mode to the reformate mode when the reformer has warmed up to a point at which operation in the reformate mode results in low emissions.

* * * * *